US 11,754,739 B2

(12) United States Patent
Wilson et al.

(10) Patent No.: US 11,754,739 B2
(45) Date of Patent: Sep. 12, 2023

(54) MAGNETIC SUSCEPTIBILITY AND CONDUCTIVITY MODULE

(71) Applicant: REFLEX INSTRUMENTS ASIA PACIFIC PTY LTD, Balcatta (AU)

(72) Inventors: Cory Bryce Wilson, Atascadero, CA (US); Timothy Merle Price, Templeton, CA (US); Christopher Thomas Koplan, Atascadero, CA (US)

(73) Assignee: REFLEX INSTRUMENTS ASIA PACIFIC PTY LTD

( * ) Notice: Subject to any disclaimer, the term of this patent is extended or adjusted under 35 U.S.C. 154(b) by 0 days.

(21) Appl. No.: 17/781,889

(22) PCT Filed: Dec. 1, 2020

(86) PCT No.: PCT/AU2020/051307
§ 371 (c)(1),
(2) Date: Jun. 2, 2022

(87) PCT Pub. No.: WO2021/108849
PCT Pub. Date: Jun. 10, 2021

(65) Prior Publication Data
US 2023/0025566 A1     Jan. 26, 2023

Related U.S. Application Data

(60) Provisional application No. 62/942,360, filed on Dec. 2, 2019.

(51) Int. Cl.
*G01V 3/28* (2006.01)
(52) U.S. Cl.
CPC .................................... *G01V 3/28* (2013.01)

(58) Field of Classification Search
None
See application file for complete search history.

(56) References Cited

U.S. PATENT DOCUMENTS

| 3,679,969 A | 7/1972 | Fussell |
| 3,697,870 A | 10/1972 | Brenner |

(Continued)

OTHER PUBLICATIONS

Australian Patent Office, International Search Report issued in corresponding Application No. PCT/AU2020/051307, dated Feb. 16, 2021.

(Continued)

*Primary Examiner* — Douglas X Rodriguez
(74) *Attorney, Agent, or Firm* — Stites & Harbison, PLLC; Terry L. Wright

(57) ABSTRACT

A magnetic susceptibility and conductivity tool (10) which incorporates a transmitter coil (4) energized with a time-varying current from a transmitter coil drive (13). The transmitter coil drive receives a clock signal and induces a data signal (99) including a primary mutual coupling signal and a formation coupling signal. A receiver coil (1) outputs a receiver coil voltage induced by the data signal. A transmitter coil current sense circuit (15) receives current from the transmitter coil and outputs a digital coil current voltage signal. A synthetic null circuit (14) receives the digital current voltage signal and multiplies the digital current voltage signal with a predetermined constant (28) for amplitude of a base primary mutual coupling signal and shifts phase with a predetermined phase offset (27) to output a synthetic null signal (104).

13 Claims, 9 Drawing Sheets

(56) References Cited

U.S. PATENT DOCUMENTS

| | | |
|---|---|---|
| 3,758,848 A | 9/1973 | Dowling |
| 4,611,173 A | 9/1986 | Bravenec et al. |
| 4,845,434 A | 7/1989 | Kuckes et al. |
| 5,729,143 A | 3/1998 | Tavernetti et al. |
| 6,927,577 B2 | 8/2005 | Nelson |
| 7,026,820 B2 | 4/2006 | Xiao et al. |
| 2007/0024286 A1* | 2/2007 | Wang .................. G01V 3/28 |
| | | 324/338 |

OTHER PUBLICATIONS

Australian Patent Office, International Preliminary Report on Patentability issued in corresponding Application No. PCT/AU2020/051307, dated Dec. 23, 2021.

* cited by examiner

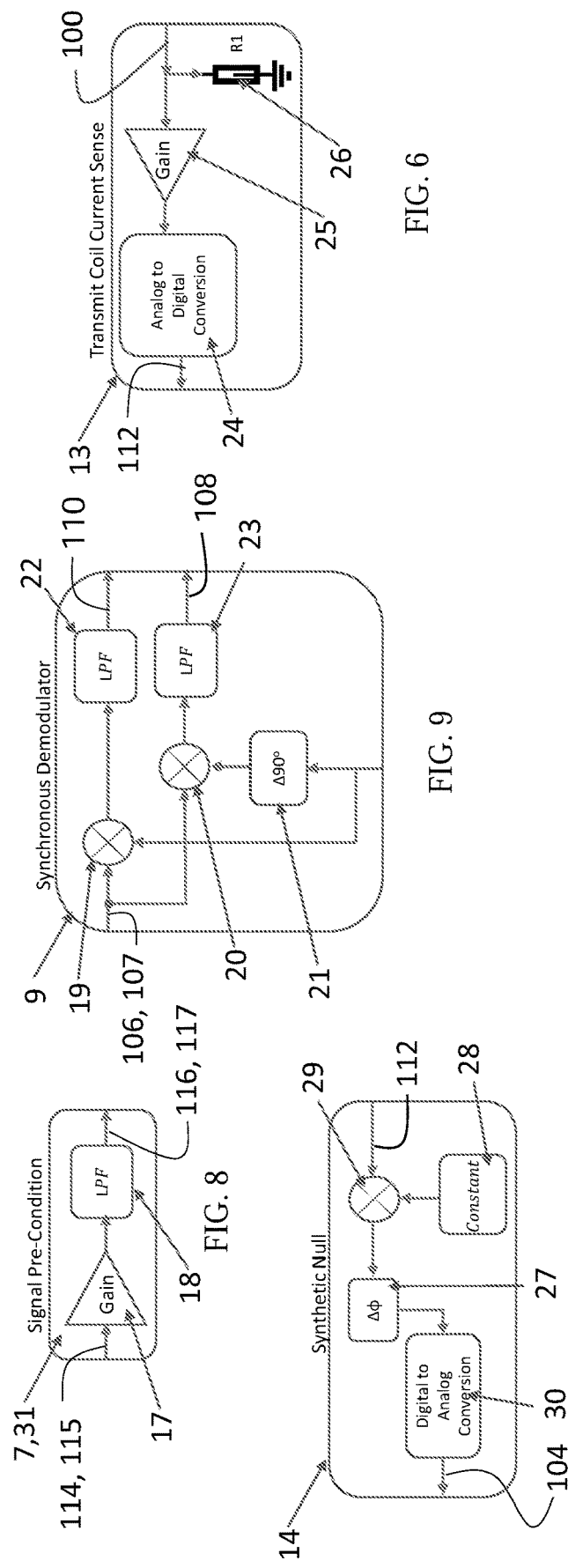

MAGNETIC SUSCEPTIBILITY AND CONDUCTIVITY MODULE

REFERENCE TO RELATED APPLICATIONS

This application claims priority of U.S. Provisional Application Ser. No. 62/942,360 entitled MAGNETIC SUSCEPTIBILITY AND CONDUCTIVITY TOOL filed on Dec. 2, 2019, the disclosure of which is incorporated herein by reference. This application is with U.S. Provisional Application Ser. No. 62/942,353 filed December 2, entitled FIT FOR PURPOSE MEASUREMENT SYSTEM FOR BLAST HOLE LOGGING forming the priority document for a PCT application filed substantially concurrently herewith, the disclosure of which is incorporated herein by reference.

BACKGROUND

Field

This invention relates generally to the field of borehole geophysical measurement instruments and more particularly to a combined magnetic susceptibility and conductivity module for use in logging tools for mining applications, more particularly for preparation of blast holes in mining.

Description of the Related Art

In the field of mining, particularly mining blast holes, the geophysical measurement of magnetic susceptibility and conductivity around a blast hole is desirable for characterizing the minerals surrounding the borehole formation. In general, the magnetic susceptibility & conductivity measurements are carried out by two separate tools. In general, each instrument is deployed into a borehole environment one after the other, where for example, a first instrument that measures the magnetic susceptibility is lowered downhole to measure the magnetic susceptibility of the borehole formation, this instrument is then withdrawn and then the conductivity instrument is deployed downhole to measure the conductivity of the borehole formation. Both such tools can be deployed into the earth from a winch system and operate with power and communication over wireline cabling. The tool can also operate in battery mode where tool data is logged into memory and is later retrieved.

Both the magnetic susceptibility & conductivity tools comprise a system which includes a transmitter coil spaced apart from a receiver coil and, in current systems, a bucking or passive coil set, that are all generally connected in series. In order to obtain the geophysical properties of magnetic susceptibility and conductivity, the transmitter coil is energized with an electrical stimulus which radiates electromagnetic energy into the surrounding area, inducing an electromagnetic field that interacts with the surrounding area and eventually this electromagnetic field returns to the receiver coil. The receiver coil signal voltage is sensitive to the surrounding area conductivity and to the degree the area can be magnetized.

The fundamental principle of the operation of the tool is to transmit an electromagnetic field into the earth formation about the borehole and observe the interaction through the coupling with a receiver coil. Practically, the energy coupled from the transmitter to the receiver can occur directly without interacting with the formation around the borehole, known as primary mutual coupling, or indirectly by interacting with the formation around the borehole. The magnitude of the primary mutual coupling can be orders of magnitude larger than the coupling from the formation making the smaller signal difficult to detect. The formation coupling is much smaller in amplitude than the primary mutual coupling signal and therefore it must be amplified for proper analog to digital conversion. With the full strength of the primary coupling signal present at the receiver, the gain amplifier output can saturate. Therefore, prior to the gain amplifier, a nulling signal of equal amplitude and phase as the primary coupling signal is electronically subtracted from the primary coupling signal. If the nulling signal matches identically the primary coupling signal, the primary coupling signal is nulled completely prior to the required amplification. The amplifier gain can then be adjusted so that the formation signal can be digitally acquired. Prior art devices generate the nulling signal passively through a pair of tightly coupled coils. Some patents describing passive null compensation techniques are U.S. Pat. Nos. 3,758,848, 3,882,375, 3,657,636, 3,555,409 and 3,147,429. These passive nulling techniques all have limitations in performance, manufacturability, ease of calibration and multifrequency operation that the present invention addresses. The passive nulling coil pair can create fields that interfere with the main receiver coil or leak fields into the formation creating additional noise in the measured signal. The significant support circuitry required for the passive coil techniques is a source of noise interference to the main measurement coils and signal processing electronics. The passive null coil pair must be manufactured to precisely offset the primary coupling which is a labor-intensive process and is limited by the physical adjustments of the nulling coil geometry. The passive null coil pair is not practical for multifrequency operation due to coupling changes over frequency which would have to be reflected physically in the coil geometry.

A typical implementation of these type of instruments can be difficult to manufacture and calibrate as well as being sensitive to temperature in the borehole environment. A unique invention is presented in the following description that simplifies manufacture and calibration while improving the performance of the measurement.

It is therefore desirable to provide a magnetic susceptibility and conductivity measurement tool which eliminates these issues.

SUMMARY

The implementations disclosed herein provide a magnetic susceptibility and conductivity module for implementation in a logging tool. In a first aspect, a drill hole logging tool for measuring the combined geophysical parameters of magnetic susceptibility and conductivity of a drill hole formation incorporates a transmit circuit for transmitting a signal into said formation ("transmitter signal") and a receive circuit for receiving the signal after it has interacted with said formation ("receiver signal"). A synthetic null receives and processes said transmitter signal. A digital domain for processing the transmitter and the receiver signals provides a drill hole formation signal. The synthetic null is part of the digital domain.

In another aspect, the transmit circuit employs a transmitter coil energized with a time-varying current from a transmitter coil drive. The transmitter coil drive receives a clock signal whereby an electromagnetic field of the transmitter coil induces a data signal which includes a primary mutual coupling signal and a formation coupling signal.

In another aspect, the receiver circuit includes at least one receiver coil at a spacing from the transmitter coil outputting a receiver coil voltage induced by the data signal.

In another aspect, the synthetic null employs a synthetic null circuit receiving the digital current voltage signal. The synthetic null circuit multiplies the digital coil current voltage signal with a predetermined constant for amplitude of a base primary mutual coupling signal and shifts phase with a predetermined phase offset with no formation coupling component and outputs a synthetic null signal. A subtraction circuit receives and subtracts the synthetic null signal from the receiver coil voltage to output a process signal.

In another aspect, a signal precondition circuit receives the process signal and outputs a conditioned signal. An analog to digital converter receives the conditioned signal and outputs a digitized voltage signal. A synchronous demodulator circuit receives the digitized voltage signal and outputs a conductivity signal and a magnetic susceptibility signal.

In yet another aspect, a magnetic susceptibility and conductivity module for a logging tool, the module incorporates a transmitter coil energized with a time-varying current from a transmitter coil drive, the transmitter coil drive receiving a clock signal whereby an electromagnetic field of the transmitter coil induces a data signal which includes a primary mutual coupling signal and a formation coupling signal. At least one receiver coil at a spacing from the transmitter coil outputs a receiver coil voltage induced by the data signal. A transmitter coil current sense circuit receiving current from the at least one transmitter coil outputs a digital coil current voltage signal. A synthetic null circuit receives the digital current voltage signal and multiplies the digital coil current voltage signal with a predetermined constant for amplitude of a base primary mutual coupling signal and shifts phase with a predetermined phase offset with no formation coupling component to output a synthetic null signal. A subtraction circuit receives and subtracts the synthetic null signal from the receiver coil voltage to output a process signal. A signal precondition circuit receives the process signal and outputs a conditioned signal. An analog to digital converter receives the conditioned signal and outputs a digitized voltage signal. A synchronous demodulator circuit receives the digitized voltage signal and outputs a conductivity signal and a magnetic susceptibility signal.

In a further aspect, the synchronous demodulator circuit employs a first multiplier receiving the clock signal and multiplying the digitized voltage signal to output the conductivity signal. A second multiplier receiving the clock signal through a phase shifter multiplies the voltage signal to output the magnetic susceptibility signal.

In a further aspect, the predetermined constant is established with the module suspended in free air in a laboratory setting resulting in substantially no formation coupling component in the signal leaving only the primary mutual coupling signal whereby the magnitude of the output of first multiplier is the same as the amplitude of the data signal received.

In a further aspect, the predetermined phase offset is established whereby phase of the synthetic null signal is aligned with the phase of the data signal with substantially no formation coupling component in the signal leaving only the primary mutual coupling signal.

In another aspect, the at least one receiver coil comprises a plurality of n receiver coils, each of the plurality of n receiver coils having a spacing Ln from the transmitter coil.

In yet another aspect, a magnetic susceptibility and conductivity module providing focused conductivity includes a transmitter coil energized with a time-varying current from a transmitter coil drive, the transmitter coil drive receiving a clock signal whereby an electromagnetic field of the transmitter coil induces a data signal which includes a primary mutual coupling signal and a formation coupling signal. A transmitter coil current sense circuit receives current from the transmitter coil and outputs a digital coil current voltage signal. A first receiver coil at a first spacing from the transmitter coil outputs a first receiver coil voltage induced by the data signal. A first synthetic null circuit receiving the digital coil current voltage signal multiplies the digital coil current voltage signal with a first predetermined constant for amplitude of a first base primary mutual coupling signal and shifts phase with a first predetermined phase offset with no formation coupling component to output a first synthetic null signal. A first subtraction circuit receives and subtracts the first synthetic null signal from the first receiver coil voltage to output a first process signal. A first signal precondition circuit receiving the first process signal outputs a first conditioned signal. A first analog to digital converter receiving the first conditioned signal outputs a first digitized voltage signal. A second receiver coil at a second spacing from the transmitter coil outputs a receiver coil voltage induced by the data signal. A second synthetic null circuit receiving the digital coil current voltage signal multiplies the digital coil current voltage signal with a second predetermined constant for amplitude of a second base primary mutual coupling signal and shifts phase with a second predetermined phase offset with no formation coupling component and outputs a second synthetic null signal. A second subtraction circuit receives and subtracts the second synthetic null signal from the second receiver coil voltage to output a second process signal. A second signal precondition circuit receiving the second process signal outputs a second conditioned signal. A second analog to digital converter receiving the second conditioned signal outputs a second digitized voltage signal. A synchronous demodulator circuit receives the first and second digitized voltage signals and outputs a short conductivity signal and a long conductivity signal. A multiplier receives the short conductivity signal and a temperature calibration parameter providing a corrected short conductivity signal. A subtraction circuit receives the corrected short conductivity signal and the long conductivity signal to provide a focused conductivity signal.

In another aspect, the first synthetic null, second synthetic null and synchronous demodulator circuit are in a digital domain.

In another aspect, the synchronous demodulator employs a phase shifter receiving a clock signal from a master clock. A first multiplier receiving a phased shifted signal from the phase shifter and the first digitized voltage signal provides a first product. A low pass filter (LPF) receiving the first product provides DC components as the short conductivity signal. A second multiplier receiving the phase shifted signal from the phase shifter and the second digitized voltage signal provides a second product. A second LPF receiving the second product provides DC components as the long conductivity signal.

BRIEF DESCRIPTION OF THE DRAWINGS

These and other features and advantages of the present invention will be better understood by reference to the following detailed description of exemplary embodiments when considered in connection with the accompanying drawings wherein:

FIG. 6 is a block diagram of the transmitter coil current sense circuit;

FIG. 7 is a block diagram of the synthetic null circuit;

FIG. 8 is a block diagram of the signal precondition circuit;

FIG. 9 is a block diagram of the synchronous demodulator circuit;

DETAILED DESCRIPTION

Theory Behind the Tool

Figure 1A:
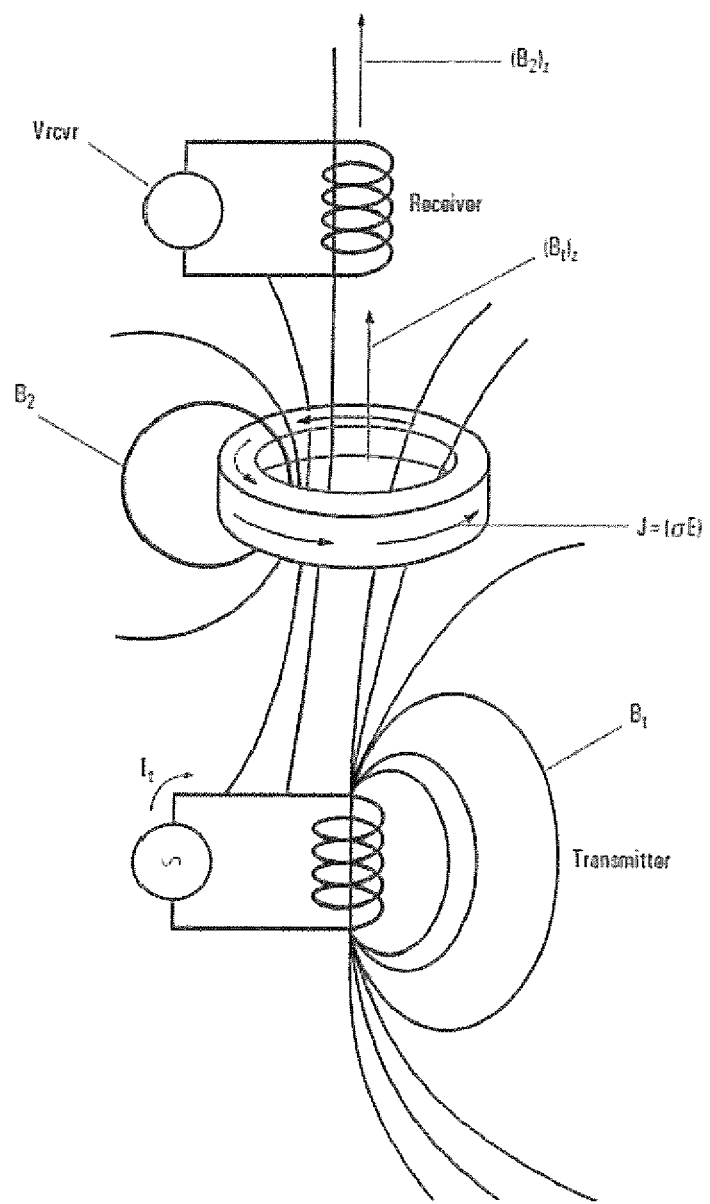
FIGS. 1A and 1B are a representation of the transmitter coil and receiver coil in formation to describe the basic mutual inductance measurement device configuration.

Magnetic susceptibility quantifies the degree to which a material can be magnetized. This quantity also relates to the mineralogy in question which helps one determine the specific rock type in the formation. The magnetic susceptibility measurement device is an induction based, wireline powered, downhole technology, consisting of a transmitter and receiver coil(s) which provides magnetic susceptibility to the operator.

The measurement device of the present invention consists of a transmitter coil and one or more receiver coils and produces an alternating magnetic field with frequencies typically in the range of 1 to 20 kHz. The transmitter signal is received and conductivity of the nearby material, is measured. The magnetic field depth of investigation and vertical resolution is primarily dependent on the coil spacing, formation conductivity as well as the operating frequency. The coils are mounted and housed using non-conductive and non-magnetic materials. The electronics are mounted uphole on a metal chassis and housing as is typical of borehole instrumentation.

The magnetic susceptibility can be determined with a measurement in the borehole. Common rocks which are required to be identified span a range of 0.5 to $10^{-5}$ cgs units or $4\pi \times (0.5$ to $10^{-5})$ SI units.

When the conductivity of the surrounding medium is low, such as that of air, the source-imposed-field response received by the receiver coil is due solely to the direct mutual coupling between the transmitter and receiver coil. In practice, the source-imposed-field response will have some conductivity and thus the eddy current that is induced in it will cause a secondary signal to develop in the receiving coil.

The principal way to separate the signal response that is due to the direct coupling (quadrature X signal) and secondary eddy current (in-phase R signal) is by electronic means. The X signal will carry the magnetic susceptibility information while the R signal will carry the conductivity. However, when the conductivity is non-zero, the X signal will diminish according to the formation conductivity and thus affect the magnetic susceptibility measurement.

It may be possible, unless absolute accuracy is paramount, that conductivity compensation for magnetic susceptibility is unnecessary. Although a larger coil spacing will increase the depth of investigation, more of the response of the measurement device will come from the formation due to eddy currents and this affect will begin to dominate the response. Keeping the frequency low, the coils in close proximity, and the conductivity low, will yield the least error in the magnetic susceptibility reading.

If the coil spacing is large, and/or the induction frequency is high, and/or the formation conductivity is high, there can be a reduction in the magnetic susceptibility reading which can impede its accuracy.

It is expected that, given the coil parasitic capacitance, the actual voltage measured on the coil open terminals will vary with frequency as the displacement current It is expected that, given the coil parasitic capacitance, the actual voltage measured on the coil open terminals will vary with frequency as the displacement current associated with the parasitic capacitance takes effect. It is for this reason that separate nulling coils are required in the prior art for separate frequencies. This is the case for magnetic susceptibility (1200 Hz) and inductive conductivity (40 kHz). The implementations disclosed herein produce nulling without the presence of separate nulling coils through subtraction of a calibrated constant from the signal received by the receiver coils, defined herein as a "synthetic null". The synthetic null produces a signal that is in anti-phase and has the same magnitude as the direct mutual coupling signal at the subtraction point. Measurement devices that use a synthetic null as disclosed herein are easier to manufacture, more accurate and easier to calibrate. Further, such devices of the present invention, without physical nulling coils, provide a reduction in overall length of a logging tool employing the device beneficial for use in applications with shorter drill holes.

Figure 1B:
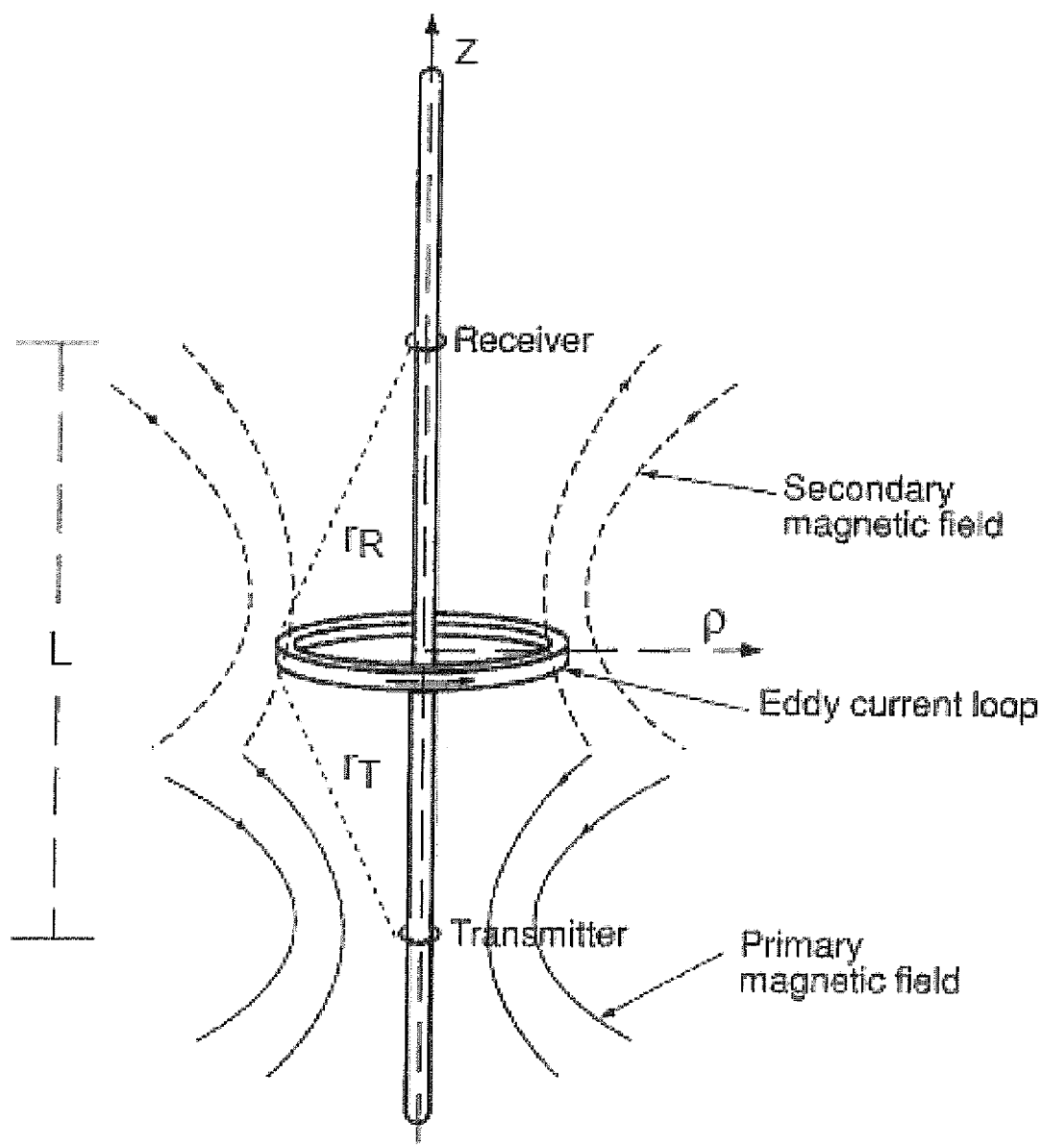

FIGS. 1A and 1B describe a configuration for measurement of basic mutual inductance.

The voltage measured across the receiver coil, $V_r$, is as follows $$\frac{V_r}{K} = \sigma_R + j\sigma_X = \sigma\left(1 - \frac{2}{3}\frac{L}{\delta}\right) + \left(\frac{2}{\omega\mu L^2} - \frac{2}{3}\frac{L}{\delta}\right)j$$

where K is a predetermined constant and the skin effect is $$\delta = \sqrt{\frac{2}{\omega\mu\sigma}}$$

The real part, $\sigma_R$, is proportional to the conductivity whereas the quadrature part, $\sigma_X$, is proportional to the magnetic susceptibility. Each term is dependent on the skin effect. The coil spacing, L, and frequency, $\omega$, diminish the skin effect in most cases and for most of the analysis can be omitted. You could compensate for the skin-effect in the conductivity. By using the quadrature part, $\sigma_X$, you can calculate the skin effect, $\delta$, assuming the real part, $\sigma_R$, is zero as is expected in non-conductive environment.

$$\frac{2}{3}\frac{L}{\delta} = \left(\frac{2}{\omega\mu L^2} - \sigma_X\right)$$

Real-time calculation of $$\frac{2}{3}\frac{L}{\delta}$$

can be performed in the quadrature channel, independent of the quadrature part, $\sigma_X$. Also, the $$\frac{2}{3}\frac{L}{\delta}$$

term can be measured indirectly and the value applied instead of performing the calculation to determine the skin effect, $\delta$.

Taking the quadrature part, $\sigma_X$, of the received voltage, and assuming conductivity to be zero, the following is determined:

$$V_r = K_{mag}(1+\chi)$$

$K_{mag}$=Magnetic Susceptibility Constant and the permeability, $\mu=\mu_0(1+\chi)$ The receiver nulling coil voltage is designed to equate to the primary receiver coil voltage in air $$V_{null} = K_{mag} + \epsilon$$

The epsilon error, $\epsilon$, accounts for the fact that the nulling coil does not perfectly balance out the free air received voltage. Therefore, the actual voltage measured by the circuitry consists of the receiver coil voltage minus the null coil receiver voltage (difference performed by instrumentation amplifier)

$$V = V_r - V_{null} = K_{mag}(1+\chi) - (K_{mag}+\epsilon) = K_{mag}\chi - \epsilon$$

If the measurement device is then placed in air (magnetic susceptibility=0), the epsilon error, $\epsilon$, can be found $$-\epsilon = V_{air}$$

The receiver voltage then becomes $$V = K_{mag}\chi + V_{air}$$

Solving for the magnetic susceptibility $$\chi = \frac{1}{K_{mag}}(V_{formation} - V_{air})$$

By subtracting the air voltage, $V_{air}$, measurement the mutual coupling is bucked out and the receiver voltage becomes $$V = K_{mag}\chi$$

Now, taking the real part, $\sigma_R$, of the received voltage $$\frac{V_r}{K_{cond}} = \sigma_R\left(1 - \frac{2}{3}\frac{L}{\delta}\right)$$

$K_{cond}$ = Conductivity Constant

The skin effect is assumed to be minuscule, thus neglecting the skin effect, the conductivity receiver voltage becomes:

$$V_r = \sigma K_{cond} + V_{air}$$

Solving for the conductivity $$\sigma = \frac{1}{K_{cond}}(V_r - V_{air})$$

The relationship between magnetic susceptibility constant and conductivity constant is $$\frac{K_{cond}}{K_{mag}} = \frac{\mu\omega L^2}{2}$$

$\omega$ is the frequency in radians per second
$\mu$ is the magnetic permeability
L is the spacing for the coils With this relationship, $K_{mag}$ is measured and then $K_{cond}$ is calculated.

The calibration will help determine the conductivity and magnetic susceptibility constants through measurement as the theoretical approach cannot account for the variation in physical tool parameters.

To measure magnetic constant, $K_{mag}$ for magnetic susceptibility, a large cylinder filled with material of known magnetic permeability, $\mu$ into which the measurement device may be inserted is employed. The permeability can be measured with an accurate reference tool, e.g. an accuracy of 1% from 1 to 1000 E-5 cgs.

To measure the conductivity constant, $K_{cond}$ for the conductivity, a large cylinder with a material of known conductivity in which the measurement device may be inserted is employed.

Temperature compensation is required and the temperature sensitivity may be monitored while the measurement device rests in either air or in its calibration medium. The measurement device response and temperature can be recorded as the tool or the environment changes in temperature and will determine how stable the measurement device is, and how accurate the measurement device performance is in relation to the expected temperature range. The maximum operating temperature range is 85° C. and the minimum is −20° C. The most critical components are the transmitter and receiver coils. The coil spacing of these components are sensitive to temperature changes and modeling these changes will assist in removing the residual effect of the temperature on the tool.

The noise-imposed field created by the space between the measurement device and the formation, known as the borehole effect, is unwanted. This space is non-symmetrical due to the measurement device not being centralized in the hole and the space in the hole is filled with air, water or mud. Existing conductivity measurement devices overcome this problem by increasing the spacing between the coils and/or having a focused measurement device which allows less sensitivity to the borehole environment. To measure the absolute magnetic susceptibility or formation conductivity when the borehole diameter is significantly larger than the measurement device will require a correction to compensate for the space between the measurement device and the formation. By eliminating the effects of this noise-imposed field, an absolute field response of the formation is measured. The dimension of a borehole is typically measured by a caliper and this data is used to estimate the noise-imposed field response due to the dynamic noise-imposed environment of mud, water, air and measurement device decentralization.

To compensate the borehole effect, more than 2 receiver coils may be employed (as described subsequently). Using all the sensors for interpretation can also contribute to quantifying the borehole effect.

Mechanical Description of the Module

Implementations shown in the drawings and described herein provide a magnetic susceptibility and conductivity module for use in a logging tool which employs a synthetic null generated digitally by computing the required amplitude and phase of the primary coupling as determined at the time of calibration. In certain implementations, the magnetic susceptibility and conductivity module may be the sole module in the logging tool. The logging tool in which the magnetic susceptibility and conductivity module is employed is configured for determining geological data characteristics of and adjacent a drill hole wherein a "drill hole" and "bore hole" are to be used interchangeably and refers to a borehole specifically drilled as part of a hole array by a drill rig in a mining bench, a grade control hole, or is to be provided with explosives and detonated to be used as a "blast hole" defined as a drill hole loaded with explosives as disclosed in application U.S. Provisional Application No. 62/942,353 filed 2 December entitled "Fit for purpose measurement system for blast hole logging" forming the priority document for a PCT application.

Figure 2A:
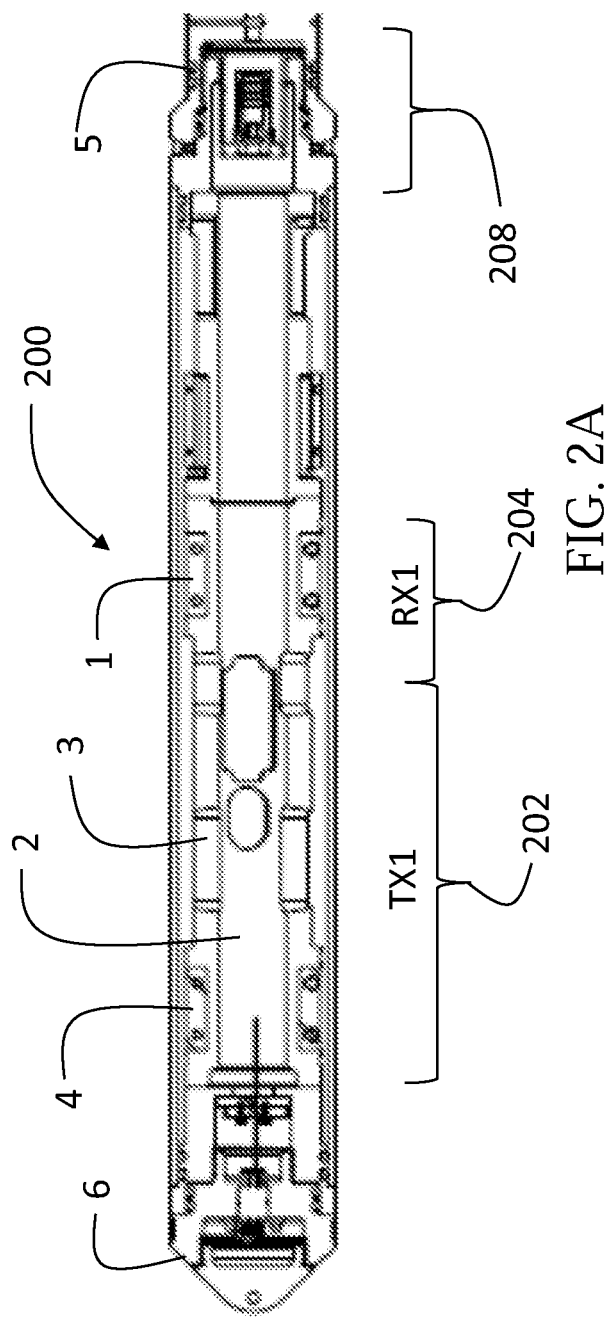
FIG. 2A is a sectioned representation of an exemplary implementation of the magnetic susceptibility and conductivity module.
Figure 2B:
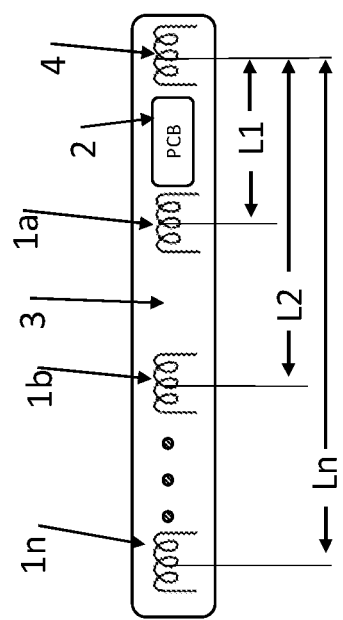
FIG. 2B is a schematic representation of magnetic susceptibility and conductivity module with multiple receiver coils.

Separate sets of synthetic null phase and magnitude values are issued for multiple frequencies of operation and the various receiver to transmitter coil spacings. The digitally computed null is then converted to an analog signal to be summed and subtracted from the signal from the primary receiver coil. An example implementation of a magnetic susceptibility and conductivity module with synthetic nulling of the primary mutual coupling signal is shown in the drawings. Referring to FIGS. 2A and 2B, the magnetic susceptibility and conductivity module 200 employs a chassis 3 made from a non-conductive and thermally stable material such as but not limited to laminated fiberglass. Chassis 3 is constructed of attachable sub-modules enabling a user to add on more sub-modules as required. A baseline implementation provides a transmitter coil 4 and receiver coil 1a with spacing L1. The transmitter coil 4 is wrapped in a sub-module TX1 202 of the chassis 3. The receiver coil 1a is wrapped in a sub-module RX1 204 of the chassis 3. Mounted on the chassis 3 between transmitter coil 4 and receiver coil 1a is a circuit board 2 containing the support circuitry required to drive the transmitter and signal process the output of the receiver including the synthetic null implementation. If a second or more receiver coils are introduced, they are placed between sub-module 202 and an upper coupling 5. The sub-modules for the transmitter and plurality of receiver coils will be in the order of sub-module TX 202, sub-module RX1 204, sub-module RX2 1106 (see FIG. 11), through sub-module RXn (shown schematically in FIG. 2B with receiver coils spaced at L2-Ln respectively) and coupling sub-module 208 terminating at upper coupling 5 at an upper end. The electronics can be housed in one or both of sub-modules RX1 or TX. The example implementation places the electronics on sub-module TX1 202. However, if multiple receiver coils are used, each receiver coil may be placed with its dedicated receiver circuit (to be described subsequently) on in the associated sub-module RXn. This enables a modular design.

The synthetic nulling system enables a parallel arrangement of the receiver coils, where each receive channel functions independently from the other receiver channels.

Modes of Operation

The electronic circuit has three parts, namely a transmit electronic circuit 50, a receiver electronic circuit 60 and the data processing/capturing circuit (Digital Domain) 70. Block diagram depictions of the three electronic circuits and the modes of operation as described with respect to FIGS. 3 and 4 as the calibration mode and operation mode.

Calibration Mode

Figure 3:
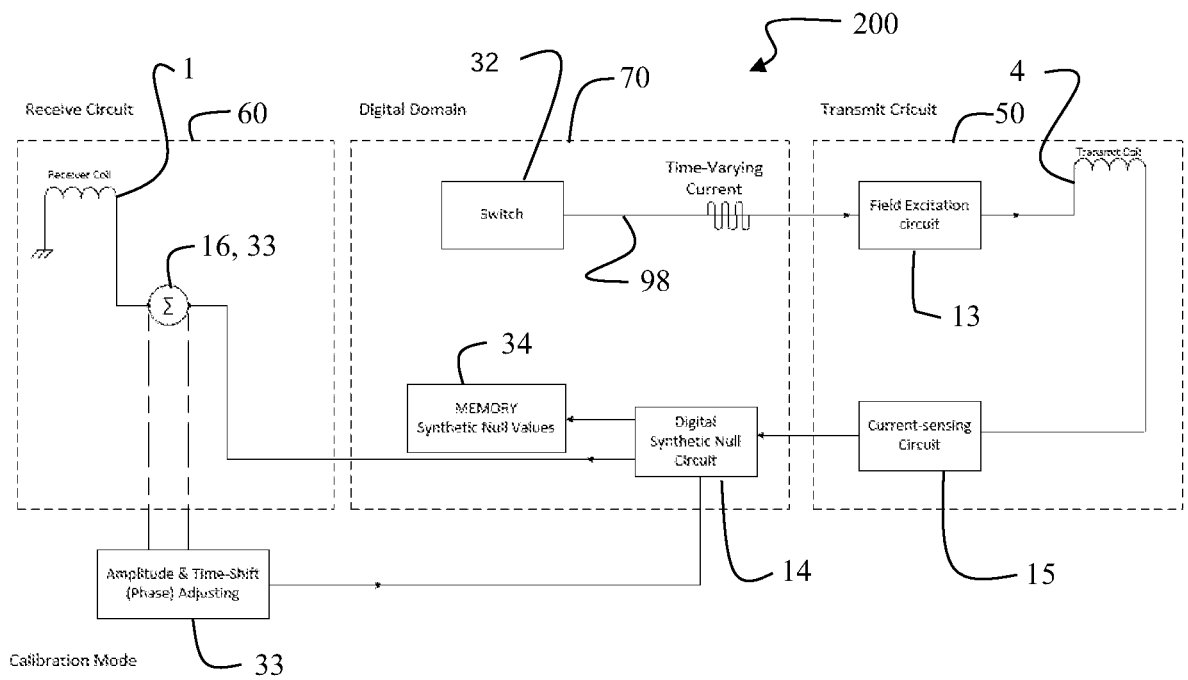
FIG. 3 is a block diagram of a calibration mode for the implementation.

Referring to FIG. 3, during synthetic null calibration the digital synthetic null circuit 14 captures the synthetic null value of the source-imposed field. The module 200 is placed in the known magnetic permeability fixture. The desired frequency for operation is selected by switch 32 and master clock 10 (see FIG. 5) provides the time varying current signal 98 to the field excitation circuit in the transmitter coil drive 13. As previously described, calibration is performed in a known magnetic susceptibility environment with zero conductivity and in a known conductivity environment. The transmitter coil 4 is powered at a desired frequency and amplitude and phase shift are adjusted with input 33 until a null is achieved. The factors applied to achieve the null are stored in a memory 34 to be provided as constants in the synthetic null circuit 14 as described subsequently.

Temperature calibration involves mathematically modeling the residual source-imposed field (assumed to only include the primary mutual coupling). The residual primary mutual coupling may include the uncompensated synthetic null signal. Although it is possible to do the synthetic null calibration during the temperature calibration, the effect is di minimis. Further, there is always some residual left after the synthetic null calibration, i.e. it is hard to perform perfect calibration. The synthetic null is 'not perfect bucking' of the source-imposed field and does not need to be so long as the resulting null signal does not saturate the front-end electronics. After the offset or synthetic null is calibrated, the output for conductivity and magnetic susceptibility is monitored over the operational temperature range while placed in free-air space. Any variation in the output is then temperature compensated. This residual signal sensitivity towards temperature is recorded when the module is placed in an open-air environment with the module performing within its operating temperature range. The resulting data (source-imposed field) is plotted versus temperature and a nth order polynomial is fitted to the data. The polynomial is then used to compensate the residual primary mutual coupling signal so that the net temperature sensitivity is minimized.

Operation Mode

Figure 4:
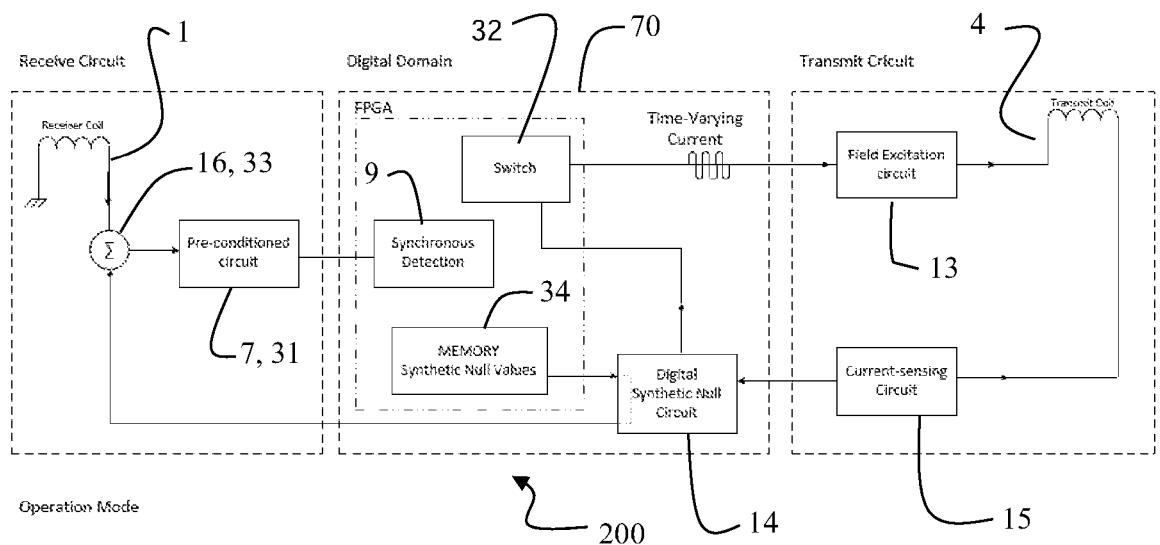
FIG. 4 is a block diagram of an operational mode for the implementation.
Figure 5:
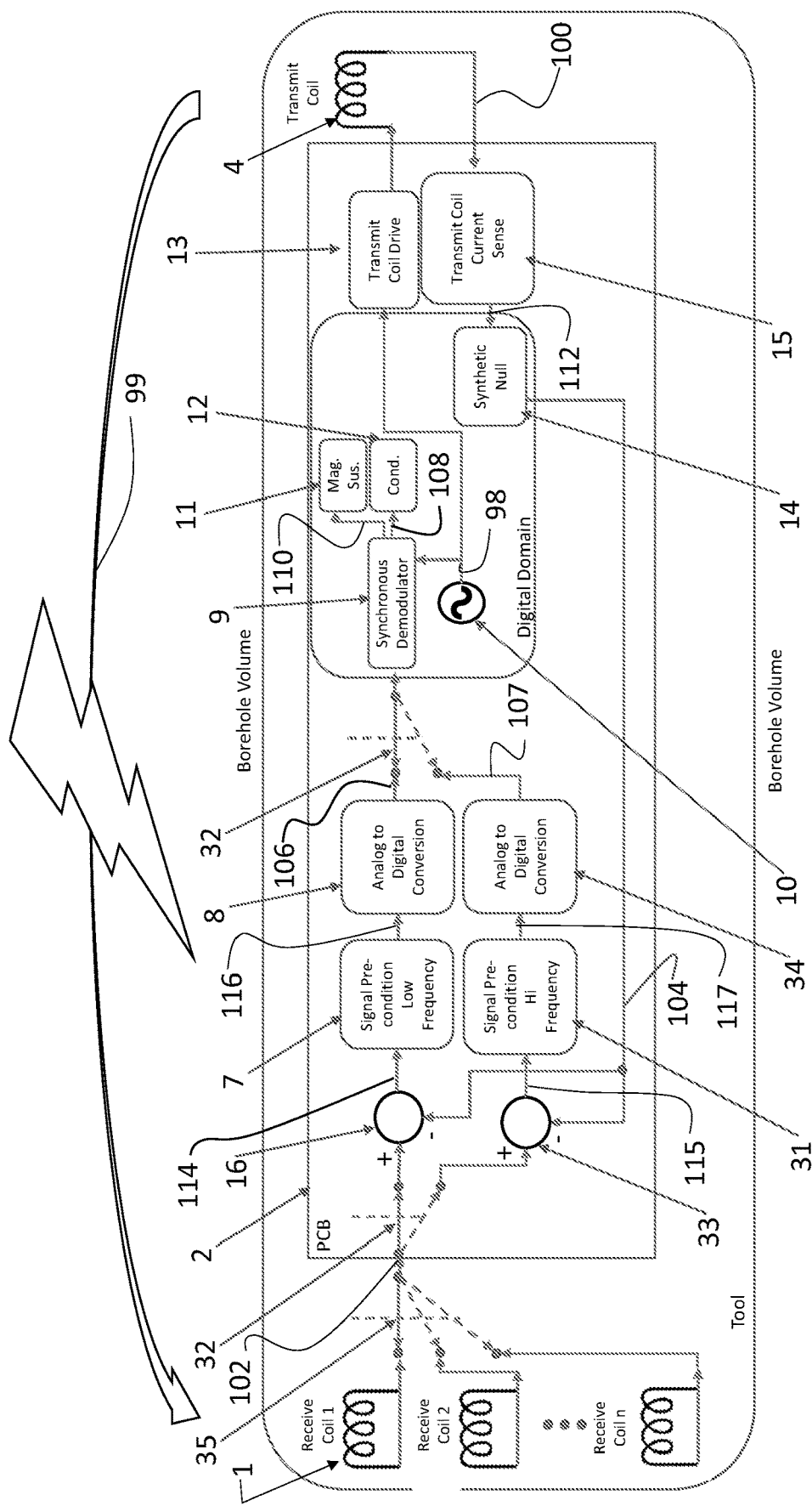
FIG. 5 is a block diagram of the elements of the magnetic susceptibility and conductivity module.

Referring to FIGS. 4 and 5, during operation the synthetic null values are converted to an analog voltage by the digital synthetic null circuit 14, which is implementable in the digital domain 70, to buck out the source-imposed field by summation/subtraction with the receiver coil output voltage in a subtraction circuit 16, 33. Pre-condition circuits 7, 31 (switched for various frequencies) then amplify and filter the synthetic bucked receiver coil voltage for analog to digital conversion. A synchronous demodulator 9 then separates the magnetic susceptibility field response data and/or the conductivity field response data from the digital synthetic bucked receiver coil voltage.

The feedback loop control system is employed in the example implementation to ensure stability of the excitation current signal used to excite the transmitter coil.

Electronic Description of the Tool

As shown in greater detail in FIG. 5, a transmitting coil 4 is energized with a time-varying current which then generates an electromagnetic field in the vicinity of the module but external from it. The electromagnetic field propagates away from the transmitter coil 4 and ultimately induces a voltage in receiver coils 1*a* through 1*n* produced by a data signal 99 which includes the primary mutual coupling signal and the formation coupling signal. The induced receiver coil voltage of each of the plurality of receiver coils is dependent, in part, on the formation parameters sought to be measured, that is, magnetic susceptibility and conductivity.

The transmitter coil signal originates with a digitally controlled master clock 10. The clock is sinusoidal and feeds a clock signal 98 to the transmitter coil drive 13. The frequency of the master clock 10 can be changed to enhance either the magnetic susceptibility or conductivity mode of operation. Transmit coil drive 13 amplifies, filters and can deliver high peak current to transmitter coil 4. The transmitter coil current is sensed in transmitter coil current sense circuit 15. Transmit coil current sense circuit 15 converts the current sensed in transmitter coil 4 to a voltage appropriate for synthetic null circuit 14. Synthetic null circuit 14 adjusts the amplitude and phase of the sensor transmitter coil signal, as will be described subsequently, such that it can be subtracted from the primary mutual coupling signal in a subtraction circuit 16 or 33. The synthetic null amplitude and phase can have separate laboratory determined values upon change of the master clock frequency or for the various spaced receiver coils.

Figure 10:
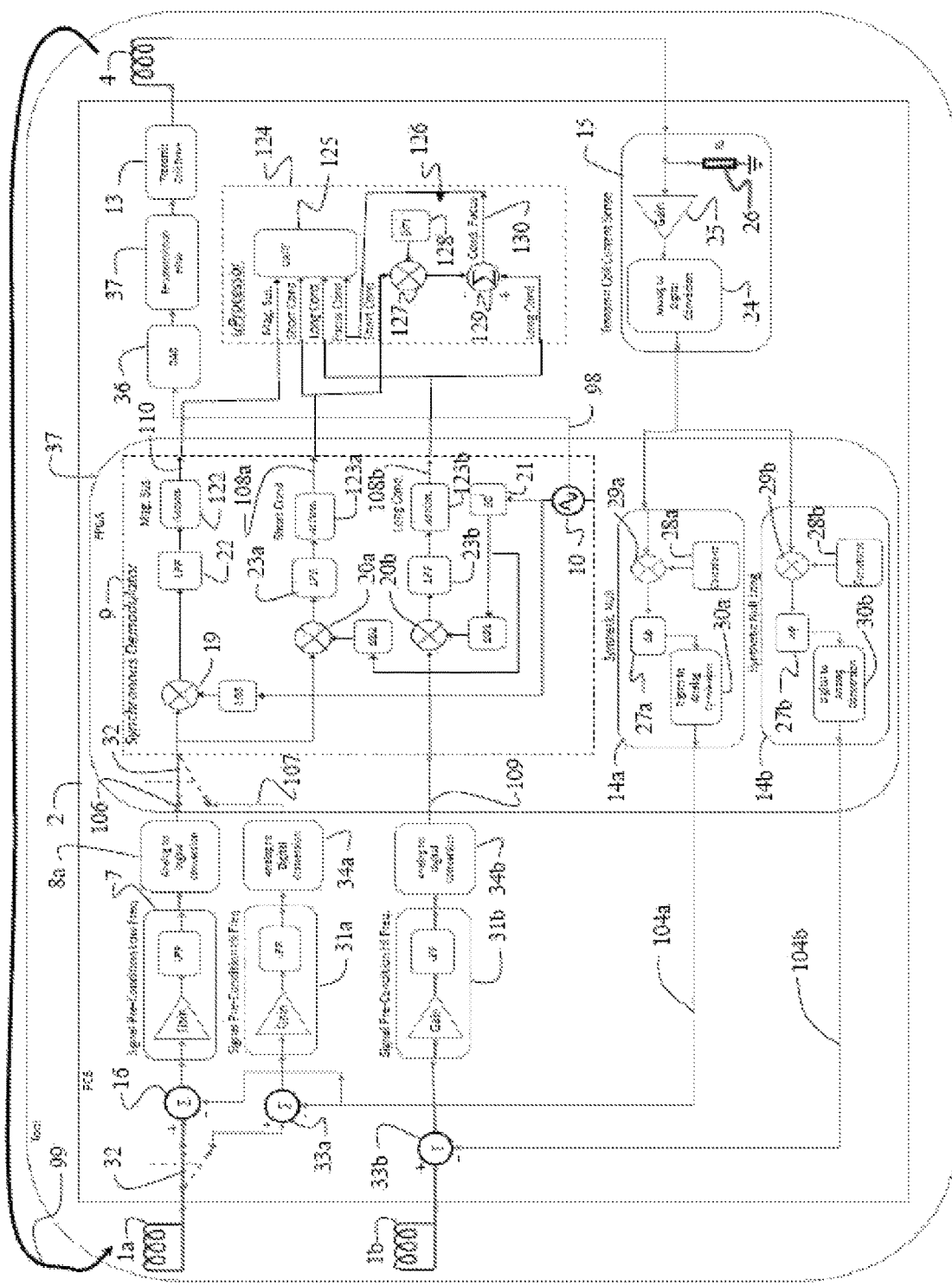
FIG. 10 is a block diagram of a specific implementation for focused conductivity.

A receiver coil voltage 102, induced by the data signal 99 in each of the plurality of receiver coils 1 through n, which is selectable by switch 35, contains the large primary mutual coupling signal between the transmitter and receiver. A synthetic null signal 104 is subtracted from the receiver coil voltage in subtraction circuit 16 or 33 depending on the frequency of operation and selectable by switch 32 (a double pole switch as represented in FIGS. 5 and 10). With the primary coupling signal subtracted and the electronic path chosen by switch 32, the signal passes to pre-condition and gain circuit 7 or 31 and then is converted from an analog signal to a digital composite signal 106, 107 in an analog to digital converter circuit 8 or 34. The separate electronic paths, switchable through switch 32, enhance the performance for the operating frequencies associated with either the magnetic susceptibility or conductivity mode. The composite signal 106, 107 prior to the synchronous demodulator circuit 9 is composed of information related to magnetic susceptibility and conductivity. Synchronous demodulator circuit 9 separates the conductivity and magnetic susceptibility information by phase and produces a conductivity signal 108 and a magnetic susceptibility signal 110 as outputs into magnetic susceptibility circuit 11 and conductivity circuit 12.

As seen in FIG. 6, the transmitter coil 4 current 100 enters the transmitter coil current sense circuit 15 and flows through sense resistor 26. The voltage developed across resistor 26 is amplified and conditioned by amplifier 25. The coil current voltage is then converted from an analog signal to digital signal by analog to digital converter 24. The digital coil current voltage signal 112 enters the digital domain into the synthetic null circuit 14.

Referencing FIG. 7, the digital coil current voltage signal 112 from transmitter coil current sense circuit 15 enters multiplier 29 and is multiplied by a constant value 28. Constant value 28 is stored as a predetermined first calibration parameter established with the module suspended in a free air calibration environment (which results in substantially no formation coupling component in the signal leaving only a base primary mutual coupling signal). In the calibration environment, constant value 28 will result in the signal magnitude of the output of multiplier 29 is the same as the amplitude of the receiver coil voltage 102. Similarly, a phase offset 27 is established as a secondary calibration parameter predetermined in the calibration environment. The phase offset 27 corrects the phase of the synthetic null signal to be aligned with the phase of the data signal 102 (again with substantially no formation coupling component in the signal leaving only the primary mutual coupling signal). The magnitude and phase of the synthetic null signal 104 will match signal 102 yielding a null in process signal. A set of synthetic null phase and magnitude parameters are determined for each operating frequency of the module and each transmitter to receiver spacing for the plurality of spaced receiver coils. After operation by phase offset 27, the signal is converted from a digital signal to an analog signal via digital to analog converter 30 to produce synthetic null signal 104 to subtraction circuit 16 and 33.

Referencing FIG. 8 (with additional reference to prior FIG. 4), the subtraction circuits 16 and 33 feeds signal pre-condition circuits 7 and 31 respectively as either path is chosen by switch 32 depending on the desired mode of operation. At this point, the signal received by one of the plurality of receiver coil 1 through n selected by switch 35 is output as receiver coil voltage 102 has had the primary mutual coupling signal portion of the data signal 99 removed due to subtraction of the synthetic null signal 104. The remaining process signal 114 or 115 is composed of information relating to magnetic susceptibility and conductivity and their signal level is small. Therefore, gain circuit 17 amplifies the process signal to fit inside the signal capture window of the analog to digital converter 8. Low pass filter (LPF) 18 is an anti-alias filter prior to feeding conditioned signal 116, 117 from analog to digital converter 8, 34 to output digitized voltage signal 106, 107. For the example embodiment, the magnetic susceptibility mode is operated at 1200 Hz and the conductivity at 40 kHz. The filtering and gain of each channel are predetermined for best operation at these frequencies. These channels are multiplexed into the synchronous demodulator by switch 32

As seen in FIG. 9, the digitized voltage signal 106, 107 received in the synchronous demodulator 9 is comprised of two signal components which are shifted in phase by 90 degrees. These signal components are known as in-phase and quadrature phase signals respectively. The quadrature phase signal is a direct linkage between the transmitter coil 4 and each of the plurality of receiver coils 1 through n and is responsible for indicating magnetic susceptibility. The in-phase signal is a result of induced eddy currents in the formation and is a re-broadcasted form of the originally transmitted signal by the surrounding formation. The secondary signal is dependent on formation conductivity and in the case of free air, where conductivity is zero, its amplitude is null. The composite received signal can be decomposed into the in-phase and quadrature signals through the process of synchronous demodulation. The clock signal 98 from master clock 10 is received in a first multiplier 19 and as a 90-degree phase shifted version through phase shifter 21 in a second multiplier 20. The first multiplier 19 output will yield information in relation to conductivity while second multiplier 20 will provide information in relation to formation magnetic susceptibility. The multiplying products will produce higher order and DC components. The higher order components are removed in filters 22 and 23 and the DC components are taken as outputs as their results are directly indicative of the formation parameters to be measured. LPF 22 will send a conductivity signal 108 to first output circuit 12 whereas LPF 23 will send a magnetic susceptibility signal 110 to second output circuit 11.

In a specific implementation providing the ability to obtain focused conductivity measurement shown in FIG. 10, transmitter coil 4 is energized with a time-varying current provided by transmitter coil drive 13. The current is generated from clock 10 through DAC 36 and reconstruction filter 37. The electromagnetic field created by transmitter coil 4 induces a voltage in a pair of receiver coils 1a and 1b. The induced receiver coil voltage of each of the plurality of receiver coils is dependent, in part, on the formation parameters sought to be measured, that is, magnetic susceptibility and conductivity. The signal from receiver coil 1a is provided through switch 32 to subtraction circuits 16 or 33a, for adjustment by the synthetic null to be discussed subsequently, to a signal precondition circuit 7 for low frequency or a signal precondition circuit 31a for high frequency. The outputs of the signal preconditioning circuits 7, 31a are processed in analog to digital converters 8a, 34a and provided through additional poles of switch 32 as digitized voltage signals 106 and 107, respectively, to the synchronous demodulator 9 in the digital domain. For the example implementation the digital domain is provided by a field programmable gate array (FPGA) 37.

The signal from receiver coil 1b is provided through subtraction circuit 33b, for adjustment by the synthetic null to be discussed subsequently, to a signal precondition circuit 31b associated with the desired focused conductivity measurement. The output of the signal preconditioning circuits 31b is processed in analog to digital converter 34b and provided as digitized voltage signal 109 to the synchronous demodulator 9 in the digital domain.

Synchronous demodulator 9 receives the digitized voltage signals 106, 107 and 109 each comprised of two signal components which are shifted in phase by 90 degrees as in-phase and quadrature phase signals respectively. The quadrature phase signal is a direct linkage between the transmitter coil 4 and receiver coil 1a and is indicates magnetic susceptibility. The in-phase signal is a result of induced eddy currents in the formation and is a re-broadcasted form of the originally transmitted signal by the surrounding formation. The secondary signal is dependent on formation conductivity. The composite received signal is decomposed into the in-phase and quadrature signals for digitized voltage signals 106 and 107. The clock signal 98 from master clock 10 is received in a first multiplier 19 and as a 90-degree phase shifted version through phase shifter 21 in a second multiplier 20a. The first multiplier 19 output will yield information in relation to magnetic susceptibility while second multiplier 20a will provide information in relation to short conductivity. The multiplying products will produce higher order and DC components. The higher order components are removed in low pass filters (LPF) 22 and 23a and the DC components are taken as outputs as their results are directly indicative of the formation parameters to be measured. LPF 22 will provide a magnetic susceptibility signal 110 whereas LPF 23a will provide a short conductivity signal 108a. For the example implementation, accumulators 122, 123 hold signals 110 and 108a for further processing.

Similarly, for digitized voltage signal 109 from receiver coil 1b for long conductivity measurement, the clock signal 98 from master clock 10 is received as the 90-degree phase shifted version through phase shifter 21 in a third multiplier 20b. The third multiplier 20b will provide information in relation to long conductivity. Higher order components are removed in LPF 23b and the DC components are taken as the output. LPF 23b will provide a long conductivity signal 108b through accumulator 123b.

For the implementation of FIG. 10, the digital coil current voltage signal 112 from transmitter coil current sense circuit 15, previously described with respect to FIG. 6, is provided to synthetic null circuits 14a, and 14b. In each synthetic null circuit, 14a, 14b, the digital coil voltage signal 112 enters multiplier 29a, 29b and is multiplied by a constant value 28a, 28b. Constant values 28a and 28b are stored as a predetermined calibration parameter as previously described with respect to FIG. 7. A set of synthetic null phase and magnitude parameters are determined for the low operating frequency for transmitter to receiver spacing for first receiver coil 1a and high operating frequencies of the module and the transmitter to receiver spacing for the first and second receiver coils 1a, 1b. After operation by phase offset 27a, 27b, the signals are converted from a digital signal to an analog signal via digital to analog converters 30a, 30b to produce synthetic null signals 104a to subtraction circuit 16 and 33a and synthetic null signal 104b to subtraction circuit 33b.

Communication of the determined magnetic susceptibility and conductivity signals is accomplished in the implementation of FIG. 10 with a microprocessor 124 employing a Universal Asynchronous Receiver/Transmitter (UART) 125 or similar device. The magnetic susceptibility signal 110, short conductivity signal 108a and long conductivity signal 108b may all be transmitted directly. The microprocessor 124 additionally includes a focused conductivity module 126 employed for determination of focused conductivity.

The short conductivity signal 108a is adjusted in a multiplier 127 with a temperature calibration parameter β(T) 128 and combined with the long conductivity signal 108b in a subtraction circuit 129 to provide a focused conductivity signal 130 which is also transmitted through the UART 125.

Figure 11:
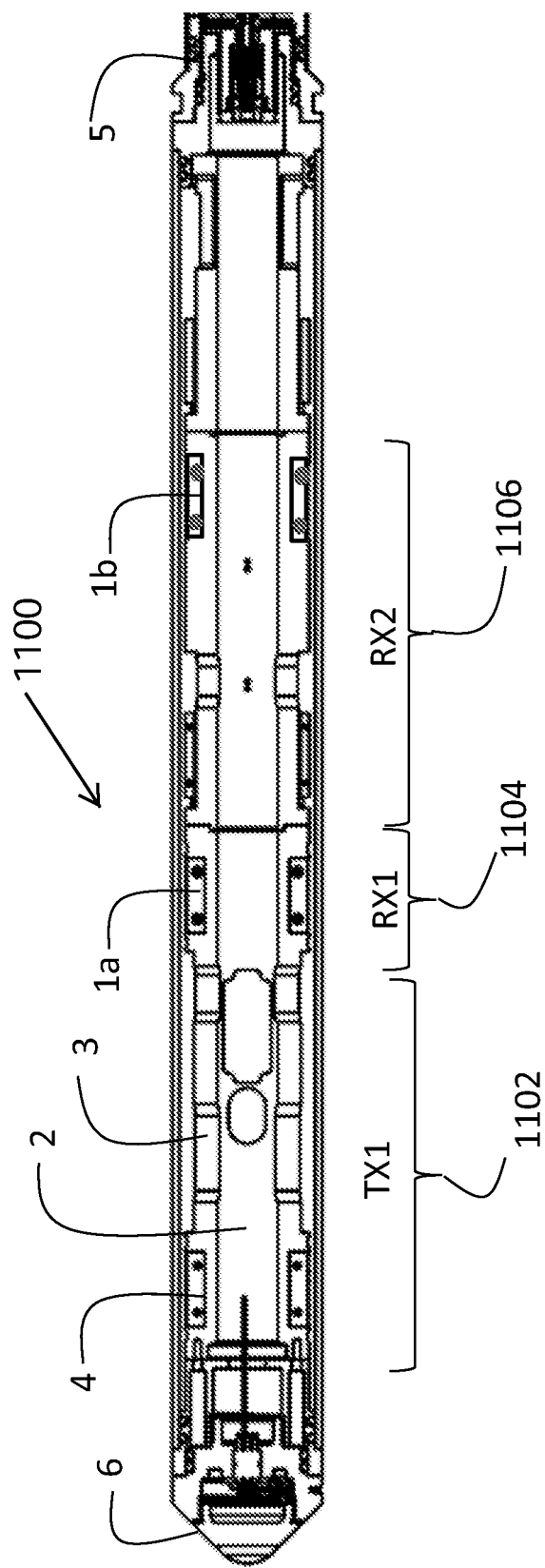
FIG. 11 is a sectioned representation of the specific implementation of FIG. 10.

The implementation of FIG. 10 is configured in a magnetic susceptibility and conductivity module 1100 with focused conductivity, as shown in FIG. 11 for insertion in a borehole logging tool. The module 1100 employs a chassis 3 made from a non-conductive and thermally stable material such as but not limited to laminated fiberglass. Chassis 3 is constructed of attachable sub-modules. A transmitter coil 4 wrapped in a sub-module TX1 1102 of the chassis 3. A short receiver coil 1a is wrapped in a sub-module RX1 1104 of the chassis 3. A long receiver coil 1b is wrapped in a sub-module RX2 1106, between sub-module 1204 and an upper coupling 5. Mounted on the chassis 3 between transmitter coil 4 and receiver coil 1a is a circuit board 2 containing the support circuitry required to drive the transmitter and signal process the output of the receiver coils including the synthetic null implementation.

Having now described various implementations of the invention in detail as required by the patent statutes, those skilled in the art will recognize modifications and substitutions to the specific implementations disclosed herein. Such modifications are within the scope and intent of the following claims. Within the claims the terms "comprising", "including", "having" and "containing" are intended to be open and additional or equivalent elements may be present. As used herein "and" and "or" are mutually inclusive unless otherwise limited.

What is claimed is:
1. A drill hole logging tool without a bucking coil for measuring the combined geophysical parameters of magnetic susceptibility and conductivity of a blast hole formation comprising:
  a magnetic susceptibility and conductivity measuring device, comprising:

a transmit circuit (50) for transmitting a signal into said formation ("transmitter signal"), a receive circuit (60) for receiving the signal via direct mutual coupling and indirectly after it has interacted with said formation ("receiver signal"), an electronic circuit for processing said transmitter and said receiver signals to provide a drill hole formation signal (108, 110), and wherein said electronic circuit generates a synthetic null from the transmitter signal, the synthetic null used to buck out, without use of the bucking coil, the direct mutual coupling from the receiver signal to provide the drill hole formation signal.

2. The drill hole logging tool as defined in claim 1 wherein the transmit circuit comprises a transmitter coil (4) energized with a time-varying current (98) through a transmitter coil drive (13), the transmitter coil drive receiving a signal from a clock (10) whereby an electromagnetic field of the transmitter coil induces a data signal (99) which includes a primary mutual coupling signal and a formation coupling signal.

3. The drill hole logging tool as defined in claim 2 wherein the receiver circuit comprises at least one receiver coil (1a . . . 1n) at a spacing from (L1 . . . Ln) the transmitter coil outputting a receiver coil voltage induced by the data signal.

4. The drill hole logging tool as defined in claim 3 wherein the electronic circuit comprises a synthetic null circuit (14) receiving the digital current voltage signal (112), said synthetic null circuit multiplying the digital coil current voltage signal with a predetermined constant (28) for amplitude of a base primary mutual coupling signal and shifting phase with a predetermined phase offset (27) with no formation coupling component and outputting a synthetic null signal (104); and further comprising:

a subtraction circuit (16, 33) receiving and subtracting the synthetic null signal from the receiver coil voltage to output a process signal (114, 115).

5. The drill hole logging tool as defined in claim 4 further comprising:

a signal precondition circuit (7, 31) receiving the process signal and outputting a conditioned signal (116, 117);

an analog to digital converter (8, 34) receiving the conditioned signal and outputting a digitized voltage signal (106, 107); and, a synchronous demodulator circuit (9) receiving the digitized voltage signal and outputting a conductivity signal (108) and a magnetic susceptibility signal (110).

6. A magnetic susceptibility and conductivity module for a logging tool, the module comprising:

a transmitter coil (4) energized with a time-varying current (98) from a transmitter coil drive (13), the transmitter coil drive receiving a clock signal whereby an electromagnetic field of the transmitter coil induces a data signal (99) which includes a primary mutual coupling signal and a formation coupling signal;

at least one receiver coil (1a . . . 1n) at a spacing from the transmitter coil outputting a receiver coil voltage induced by the data signal;

a transmitter coil current sense circuit (15) receiving current from the at least one transmitter coil and outputting a digital coil current voltage signal (112);

a synthetic null circuit (14) receiving the digital current voltage signal, said synthetic null circuit multiplying the digital coil current voltage signal with a predetermined constant (28) for amplitude of a base primary mutual coupling signal and shifting phase with a predetermined phase offset (27) with no formation coupling component and outputting a synthetic null signal (104);

a subtraction circuit (16, 33) receiving and subtracting the synthetic null signal from the receiver coil voltage to output a process signal (114, 115);

a signal precondition circuit (7, 31) receiving the process signal and outputting a conditioned signal (116, 117);

an analog to digital converter (8, 34) receiving the conditioned signal and outputting a digitized voltage signal (106, 107); and, a synchronous demodulator circuit (9) receiving the digitized voltage signal and outputting a conductivity signal (108) and a magnetic susceptibility signal (110).

7. The magnetic susceptibility and conductivity module as defined in claim 6 wherein the synchronous demodulator circuit comprises:

a first multiplier (19) receiving the clock signal and multiplying the digitized voltage signal to output the conductivity signal (108); and a second multiplier (20) receiving the clock signal through a phase shifter (21) and multiplying the voltage signal to output the magnetic susceptibility signal (110).

8. The magnetic susceptibility and conductivity module as defined in claim 7 wherein the predetermined constant is established with the tool suspended in free air in a laboratory setting resulting in substantially no formation coupling component in the signal leaving only the primary mutual coupling signal whereby the magnitude of the output of first multiplier is the same as the amplitude of the data signal received.

9. The magnetic susceptibility and conductivity module as defined in claim 7 wherein the predetermined phase offset is established whereby phase of the synthetic null signal is aligned with the phase of the data signal with substantially no formation coupling component in the signal leaving only the primary mutual coupling signal.

10. The magnetic susceptibility and conductivity module as defined in claim 7 wherein the at least one receiver coil comprises a plurality of n receiver coils (1a . . . 1n), each of the plurality of n receiver coils having a spacing (L1 . . . Ln) from the transmitter coil.

11. A magnetic susceptibility and conductivity module providing focused conductivity comprising:

a transmitter coil (4) energized with a time-varying current from a transmitter coil drive (13), the transmitter coil drive receiving a clock signal whereby an electromagnetic field of the transmitter coil induces a data signal which includes a primary mutual coupling signal and a formation coupling signal;

a transmitter coil current sense circuit (15) receiving current from the transmitter coil and outputting a digital coil current voltage signal;

a first receiver coil (1a) at a first spacing from the transmitter coil outputting a first receiver coil voltage induced by the data signal;

a first synthetic null circuit (14a) receiving the digital coil current voltage signal, said synthetic null circuit multiplying the digital coil current voltage signal with a first predetermined constant (28a) for amplitude of a first base primary mutual coupling signal and shifting phase with a first predetermined phase offset with no formation coupling component and outputting a first synthetic null signal;

a first subtraction circuit (33*a*) receiving and subtracting the first synthetic null signal from the first receiver coil voltage to output a first process signal;

a first signal precondition circuit (31*a*) receiving the first process signal and outputting a first conditioned signal;

a first analog to digital converter (34*a*) receiving the first conditioned signal and outputting a first digitized voltage signal (107);

a second receiver coil (1*b*) at a second spacing from the transmitter coil outputting a receiver coil voltage induced by the data signal;

a second synthetic null circuit (14*b*) receiving the digital coil current voltage signal, said second synthetic null circuit multiplying the digital coil current voltage signal with a second predetermined constant for amplitude of a second base primary mutual coupling signal and shifting phase with a second predetermined phase offset with no formation coupling component and outputting a second synthetic null signal;

a second subtraction circuit (33*b*) receiving and subtracting the second synthetic null signal from the second receiver coil voltage to output a second process signal;

a second signal precondition circuit (31*b*) receiving the second process signal and outputting a second conditioned signal;

a second analog to digital converter (34*b*) receiving the second conditioned signal and outputting a second digitized voltage signal (109);

a synchronous demodulator circuit (9) receiving the first and second digitized voltage signals and outputting a short conductivity signal (108*a*) and a long conductivity signal (108*b*);

a multiplier (127) receiving the short conductivity signal and a temperature calibration parameter (128) providing a corrected short conductivity signal; and, a subtraction circuit (129) receiving the corrected short conductivity signal and the long conductivity signal to provide a focused conductivity signal (130).

12. The magnetic susceptibility and conductivity module as defined in claim 11 wherein the first synthetic null, second synthetic null and synchronous demodulator circuit are in a digital domain.

13. The magnetic susceptibility and conductivity module as defined in claim 12 wherein the synchronous demodulator comprises:

a phase shifter receiving a clock signal from a master clock;

a first multiplier (20*a*) receiving a phased shifted signal from the phase shifter and the first digitized voltage signal to provide a first product;

a low pass filter (LPF) (23*a*) receiving the first product and providing DC components as the short conductivity signal;

a second multiplier (20*b*) receiving the phase shifted signal from the phase shifter and the second digitized voltage signal to provide a second product; and a second LPF (23*b*) receiving the second product and providing DC components as the long conductivity signal.

* * * * *